June 21, 1938.  A. F. KRUMHOLZ  2,121,085
CLAMP
Filed April 10, 1937
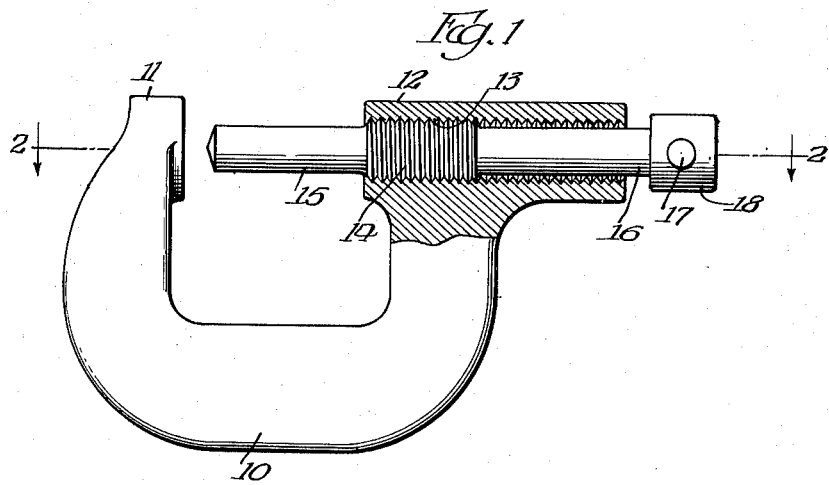
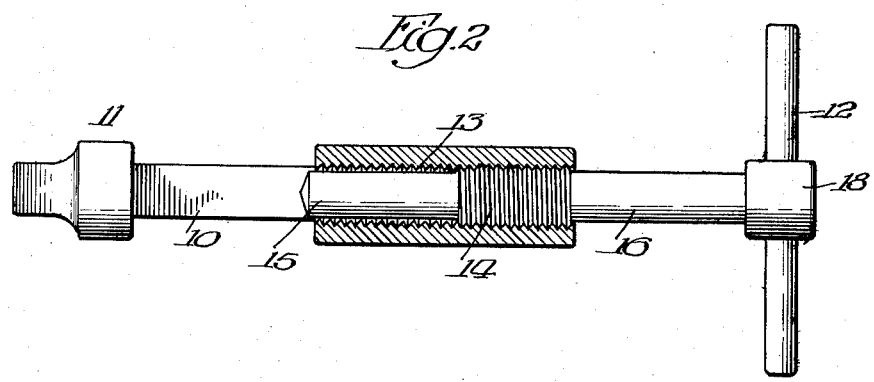
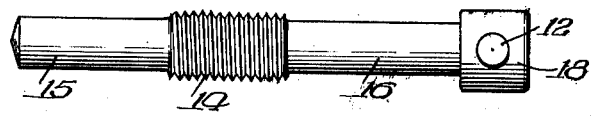
Inventor
Alfred F. Krumholz
By Patented June 21, 1938

2,121,085

UNITED STATES PATENT OFFICE 2,121,085

CLAMP

Alfred F. Krumholz, Chicago, Ill.

Application April 10, 1937, Serial No. 136,105

1 Claim. (Cl. 113—99)

This invention relates to improvements in clamps, particularly adapted for use in welding.

It is well known that with the use of the ordinary C or U clamp in welding, the solder or welding material often drops upon the thread of the clamping screw, especially on that portion of the screw which is disposed between the jaws of the clamp member, and becomes hard, and that it is difficult to remove the same; further it interferes with the proper adjustment or operation of the screw.

To remove this deposit the threads of the screw are often destroyed, thereby rendering the clamp useless.

Furthermore, such clamps when not in use are very roughly handled and it frequently happens that the threads of the screw are damaged or mutilated.

It is one of the objects of the present invention to overcome these difficulties and objections and to provide an improved clamp of this character in which the threads of the adjustable screw member will at all times be protected, both while the clamp is being used and when not in use.

A further object is to provide an improved clamp of this character in which the threads of the screw will be completely housed at all times. The portion of the screw member which projects between the jaw members and beyond the threaded bearing for the screw will present a smooth or unthreaded surface, from which any deposit or solder or welding flux may be readily removed without interfering with the threads, such portion being preferably of a cross-sectional diameter less than the cross-sectional diameter of the threaded portion, so that the adjustment or operation of the screw member will not be interfered with.

To the attainment of these ends, and the accomplishment of other new and useful objects as will appear, the invention consists in the features of novelty, in substantially the construction, combination and arrangement of the several parts, hereinafter more fully described and claimed and shown in the accompanying drawing illustrating this invention, and in which Figure 1 is a view partly in side elevation, partly in section and partly broken away, showing the screw or clamping member projected for a considerable distance into the space between the jaws of the clamp.

Figure 2 is a detail sectional view taken on line 2—2 Figure 1, showing the screw or threaded member retracted.

Figure 3 is a view of the threaded or clamping member.

The clamp consists essentially of a body portion 10 of any desired size and configuration and constructed of any suitable material, but is preferably of a substantially C, or U shape, providing opposed jaws 11—12 which are spaced from each other a suitable distance to permit the work to be positioned between the jaws.

In the jaw 12 there is provided a bearing which extends entirely there-through and the bearing or the portion of the jaw in which the bearing is provided is of a substantial length and is provided interiorly thereof with screw threads 13 of any desired or suitable pitch.

The screw or clamping member consists of a body provided with a threaded portion 14 and the portions of the body 15—16 extending beyond the ends of the threaded portion 14 may be of any desired length and are unthreaded, these portions 15—16 preferably being of a cross-sectional diameter which is less than the cross sectional diameter of the threaded portion 14. This threaded portion 14 is spaced for a substantial distance from each extremity of the body portion.

The screw or clamping member thus formed is passed through the threaded bearing in the jaw 12 and the threads 14 will engage the threads 13 in the bearing. The clamping member is of a length considerably greater than the length of the bearing and is adapted to be rotated within the bearing in any suitable manner such as by means of a bar or rod 17 constituting a handle which passes through an opening in the head 18 of the screw member.

With this improved construction it will be manifest that when the work is placed between the jaws 11 and 12 of the clamp the screw or clamping member may be adjusted so that the extremity of the portion 15 will co-operate with the jaw 11 to clamp the work there-between.

This portion 15 of the screw or clamping member will project a variable distance into the space between the jaws 11 and 12, according to the thickness of the work being operated upon, and as the portion of the screw or clamping member which does so project into this space is free from screw threads it will be manifest that any deposit which may be made upon that portion of the screw or clamping member will not interfere with the threads 14 and can be readily removed so as not to interfere with the adjustment of the screw member or clamp and without mutilating or destroying the screw threads.

This portion 15 being of a diameter less than the diameter of the threaded portion 14 may be readily moved into and out of the bearing in the jaw 12 by the adjustment of the screw member.

Similarly the portion 16 of the screw member which projects beyond the other end of the jaw 12, being free from screw threads and of a diameter less than the diameter of the threaded portion 14, will be moved into and out of the bearing during the adjustment of this thread of the screw member.

The bearing in the jaw 12 and the length of the threaded portion 14 of the screw or clamping member are of such a length, and are so disposed with respect to each other, that the threaded portion 14 will at all times be disposed within the confines of the ends of the bearing, so that no matter in what position the screw or clamping member is disposed with respect to the jaw 12, the threaded portion 14 of the screw or clamping member will at all times be housed and protected.

With this construction it will be manifest that the screw threads will always be free from any deposit of the solder or welding material, when the clamp is in use, and no matter how roughly the clamp may be handled when not in use, all danger of the threads' becoming damaged or mutilated by contact of other elements therewith will be avoided, with the result that the clamp will always be maintained in a proper condition for use.

While the preferred form of the invention has been herein shown and described, it is to be understood that various changes may be made in the details of construction, and in the combination and arrangement of the several parts, within the scope of the claim, without departing from the spirit of this invention.

What is claimed as new is:—

A clamp for holding articles to be united by welding or like process embodying a rigid body shaped to provide spaced and opposed jaws between which the articles are held, a bearing extending through one of said jaws and being of an extended length, threads in said bearing extending to the inner end thereof, a clamping member extending through and adjustable in said bearing and threads on said member spaced from the inner end thereof for a distance not less than the width of the space between said jaws, the inner end of said member beyond said threads being smooth and of a diameter substantially less than the diameter of the threaded portion whereby when said inner end of said member is withdrawn into the threaded bearing, said end will be maintained out of contact with the threads in the bearing, the threads on said member engaging the threads in said bearing.

ALFRED F. KRUMHOLZ.